Aug. 7, 1956

E. C. RANEY 2,758,190

CONTROL APPARATUS

Filed July 21, 1951

INVENTOR.
Estel C. Raney
BY
Warren M. F. Schmidt
Attorney

INVENTOR.
Estel C. Raney
Warren H. F. Schmieding
BY

Aug. 7, 1956 E. C. RANEY 2,758,190
CONTROL APPARATUS
Filed July 21, 1951 4 Sheets-Sheet 3

INVENTOR.
Estel C. Raney
BY
Warren H. F. Schmieding
ATTORNEY

Aug. 7, 1956　　　　　　　E. C. RANEY　　　　　　2,758,190
CONTROL APPARATUS
Filed July 21, 1951　　　　　　　　　　　　　　4 Sheets-Sheet 4

INVENTOR.
Estel C. Raney
BY
Warren W. F. Schmeding
ATTORNEY

United States Patent Office 2,758,190
Patented Aug. 7, 1956

2,758,190

CONTROL APPARATUS

Estel Coler Raney, Columbus, Ohio, assignor to Ranco Incorporated, Columbus, Ohio, a corporation of Ohio Application July 21, 1951, Serial No. 237,939

12 Claims. (Cl. 219—20)

The present invention relates to a controller used in a pressure or temperature responsive system. This system, in turn, is utilized to control another system, such as a refrigerating system or a heating system.

The controller of the present invention is utilized for controlling flow in a circuit, as for example the flow in a fluid circuit or electric current of an electric system. The present disclosure presents a detailed description of the use of the invention in an electrical circuit. The invention, however, can be adapted to controlling fluid such as gas, and such adaptation is well within the province of those skilled in the art. A movable flow control element is utilized with both electric circuits and gas circuits. In the former case such element is movably responsive to a condition in the circuit such as heat produced by resistance to flow of electricity. The controller includes push button mechanism which is manually movable to move a flow control element from one position to another. This mechanism also includes a latching element which is yieldingly urged to the position from which it was manually moved by the push button mechanism. The controller also includes a second latching element which cooperates with the latching element of the push button mechanism for holding the flow control element in the position to which it was moved by the push button mechanism. The controller also includes means which is movable in response to the effect produced in the circuit, as a consequence of the manual movement of the flow control element, for retaining the said element in the position in which it was moved manually, and for releasing the second latching element. Therefore, as long as the said effect obtains, the flow control element is held in the position to which it was moved manually but when that effect is changed, as for example, when the flow through the circuit ceases, the flow control element is returned, automatically, to the position from which it was manually moved by the push button mechanism.

For illustrative purposes, the present invention is shown as applied to a heating system for ovens, in which the controller of a temperature responsive system controls the electric heating circuit, or as herein shown, the heating circuits of the oven. In such type system, a thermostatic system is employed to maintain the oven at a mean temperature by intermittently energizing a heating circuit. At times it is desirable to heat the oven quickly and this can be done by either increasing the current flow through the heating element or by energizing a second heating element. Usually household ovens are provided with a bake heating element or coil and a broil heating element or coil.

The controller of the present invention is used, in a thermostatic system for maintaining the desired mean temperature in the oven and is also provided with push button mechanism, as heretofore mentioned. Specifically, current responsive mechanism, movable in response to current flow in the bake heating coil circuit, is utilized to maintain the broil coil energized after the push button latching mechanism is actuated to energize the broil coil for auxiliary heating, and this same current responsive mechanism releases the latch. Thus the broil coil remains energized until the bake coil is automatically disconnected by the controller, and since the latch is released, the broil coil is not reconnected in the electrical circuit on the succeeding completion, by the controller, of the circuit through the oven coil.

It is desirable to provide for varying the mean temperature and to this end there is provided temperature selecting mechanism including a rotable element having temperature indicating indicia. This element, when rotated, shifts the position of another element, which latter affects the temperature at which the thermostatic system functions to control the heating coil. The controller, including part of the thermostatic system, is located outside of the oven and is subjected to changes in environment temperature. Therefore, unless compensation is effected for the change in environment temperature of that part of the thermostatic system which is outside the oven, the thermostatic system would be influenced by such changes with the result that the oven temperature would not be in accord with the indicia on the rotatable temperature adjusting element. To compensate for changes in environment temperature, there is provided a temperature responsive device which is disposed between the shiftable element, of the temperature selecting mechanism, and the flow control element for the heater.

Further definitions, results and advantages of the present invention will be apparent from the following description, reference being had to the accompanying drawings, wherein one embodiment of the invention is illustrated.

Referring to the drawings and particularly Figs. 12 to 15, there is shown two heating elements in the form of electric resistance coils 20 and 21, the coil 20 will be referred to as the "bake" coil and coil 21 as the "broil" coil. It is desirable at times to use only the coil 20, at other times only the coil 21, and, when it is desirable to quickly heat the oven, both coils are energized. This latter is known in the art as the preheating phase.

The controller includes a base 23, preferably formed of thermal setting dielectric material. This base includes a bottom 24, upwardly extending side walls 25 and 26, a right end wall 27, a left end wall 28; the left end wall is somewhat narrower than the wall 27 and end wall 28 is connected to side walls 25 and 26 by connecting walls 30 and 31, respectively. A post 32 extends inwardly from the left end wall 28 and is formed integrally with the base 24. This post forms an abutment for an upwardly extending portion 33 of a terminal 34. This terminal 34 is connected to the underside of bottom 24, and the portion 33 extends through an opening in the bottom 24; a similar terminal 35 is connected with the underside of the bottom 24 and has an upwardly extending portion 36. Similar terminal and upwardly extending portions are shown at 37 and 38, and 39 and 40.

Adjacent the right side of the base, the underside of the bottom 24 carries two terminals 42 and 43 which extend upwardly through the bottom and merge into contacts 44 and 45 respectively. Terminal 42 is connected to one side of the source of electric power and 43 is connected to the other side of said source. Also adjacent the right side of the base, the bottom 24 carries two upwardly extending posts 47 and 48, which are suitably connected to the bottom 24 by integrally formed clips 49. Post 47 carries an inwardly extending contact 50 and a similar contact 51 is carried by the post 48. Contacts 44, 50, 51 and 45 are disposed in the same horizontal plane. Contacts 44 and 50 are adapted to be bridged by a contact 53, and contacts 51 and 45 are adapted to be bridged by a contact 54. Contacts 53 and 54 are carried by a strip of dielectric material 55.

Contacts 57, 58, 59 and 60 are carried, respectively, by the upwardly projecting portions 33, 36, 38 and 40 of the aforementioned terminals 34, 35, 37 and 39. The yoke 62 of a resilient, hairpin-shaped conductor 63 is suitably riveted to the post 47. The resilient arm 64 of conductor 63 carries a contact 65 which is arranged to engage the contact 58; the resilient arm 67 of the conductor 63 carries a contact 68 arranged to engage contacts 60. The yoke 70 of a resilient hairpin shaped conductor 71 is riveted to the post 48, one resilient arm 72 thereof carries a contact 73 which is arranged to engage contact 33, and the other resilient arm 75 carries a contact 76 arranged to engage contact 59.

A groove 78 extends across the bottom 24 of the base 23, and the resilient arms 64, 67, 72 and 75 of the conductors 63 and 71 extend across this groove. A slide bar 79, formed of dielectric material is bottomed in the groove, and the arms 64, 67 and 72 and 75, of the conductors 63 and 71, overlie the slide bar. Shoulders are formed on the top of the slide bar 79 by upwardly extending projections 81, 82, 83 and 84. As viewed in Fig. 12 projection 81 lies below arm 64, 82 below arm 67, 83 below arm 72, and 84 below arm 75. Resilient arm 67 through its engagement with projection 82, normally urges the slide bar 79 downwardly, as viewed in Fig. 12. The slide bar 79 can be shifted upwardly, to the position shown in Fig. 15 through a bell crank lever 86 pivoted on a pin 87, and can be latched in the position shown in Fig. 15 by mechanism to be hereinafter more fully described.

Figure 15:
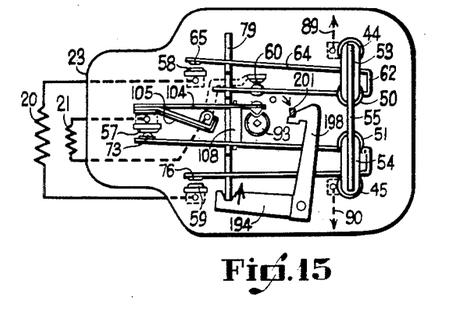
Fig. 15 is a view similar to Fig. 13 but showing the switch blades in the position in which the broil coil only is energized.

Bridging contacts 53 and 54 together with the bridged contacts 44 and 50 and bridged contacts 51 and 45, comprise the main switch which can be opened and closed manually and which can be automatically opened and closed, in response to the temperature of the oven. When contact 53 is closed on contacts 44 and 51 and bridging contact 54 is closed on contact 51 and 45, and the slide bar 79 is in the position shown in Figs. 12, 13 or 14, current flows by wire 89, from one side of the source of electric current through terminal 42, contacts 44, 53 and 50, post 47, arm 64, contacts 65 and 58, terminal 35, bake coil 20, terminal 37, contacts 76 and 59, conductor arm 75, post 48, contacts 51, 54 and 45, terminal 43 to the wire 90 which is connected to the other side of the source of power. It will be noted that at this time contact 68 is separated from contact 60 and contact 73 is separated from contact 57. Now when the slide bar 79 is shifted upwardly, as viewed in Figs. 12 to 15 and as shown in Fig. 15, contact 65 is separated from contact 58 and contact 76 is separated from contact 59. At this time contact 68 engages contact 60 and contact 73 engages contact 57. The broil coil heating circuit is then established through the following circuit, wire 89, terminal 42, contacts 44, 53 and 50, post 47, arm 67, contacts 68 and 60, terminal 39, broil coil 21, terminal 34, contacts 57 and 73, arm 72, post 48, contacts 51, 54 and 45, terminal 43, to wire 90.

Thus it can be seen that by shifting the slide bar 79, either the bake coil 20 or the broil coil 21 can be energized.

Figure 5:
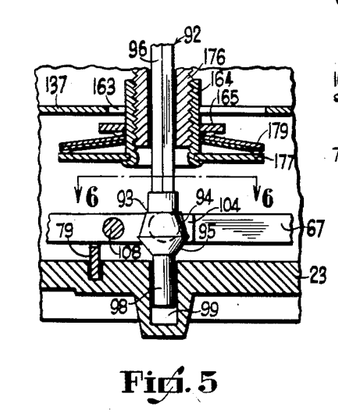
Fig. 5 is a fragmentary sectional view, also taken along substantially line 4—4 of Fig. 3 but showing the push rod in a different position from that shown in Fig. 4.
Figure 13:
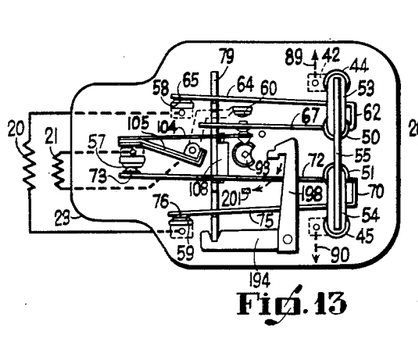
Fig. 13 is a partially diagrammatic view, similar to that of Fig. 12 showing the position of the contact just after the push rod has been actuated to connect the broil coil as an auxiliary heating coil for the oven.
Figure 14:
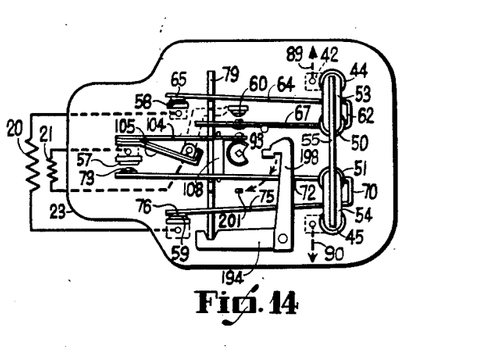
Fig. 14 is a view similar to Fig. 13 but showing the positions of the switch blades when only the bake coil is energized.

As previously stated, when it is desirable to heat a cool oven quickly, both coils 20 and 21 are energized, the coil 21 being disclosed in the broiler part of the oven. To accomplish this, mechanism is provided for moving contact 68 into engagement with contact 60, which mechanism also permits contact 73 to engage contact 57. This position of the contacts is shown in Fig. 13. This mechanism includes a push rod 92 carrying an axially arranged cam 93. This cam is shown more clearly in Fig. 5 wherein it is shown as including two cones including a downwardly outwardly flared portion 94 which merges into a downwardly inwardly inclined portion 95. The stem 96 of the push rod 92 is formed of non-circularly shaped metal, preferably square in cross section, and the cam 93 is formed of dielectric material. The lower portion of the push rod dielectric section merges into a downwardly extending shank 98 which is guided by a well 99 formed in the bottom 24 of the base. The cam 93 is formed with a longitudinally extending notch 101, for a purpose to be hereinafter described. The push rod 92 including the cam 93 can be rotated, and when rotated from the position shown in Fig. 12 and pushed downwardly, it will engage a cam follower 103 to move the same upwardly, as viewed in Fig. 13, i. e., radially with respect to the axis of the push rod 92. This cam follower 103 is carried by one end of a strip of bimetallic material 104. The other end of this strip 104 is suitably welded or otherwise joined with an end of another bimetallic strip 105. The other end of bimetallic strip 105 is connected by a screw 106 to the bus bar 107 forming part of terminal 39.

Figure 6:
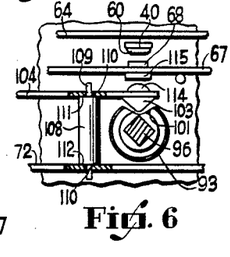
Fig. 6 is a fragmentary view, showing the push rod in section, the section being taken along line 6—6 of Fig. 5.
Figure 7:
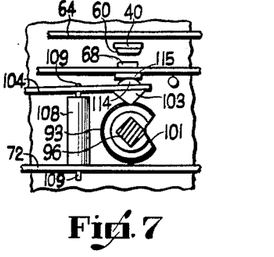
Fig. 7 is a view similar to Fig. 6 but showing the push rod rotated 90° from the position shown in Fig. 6.
Figure 8:
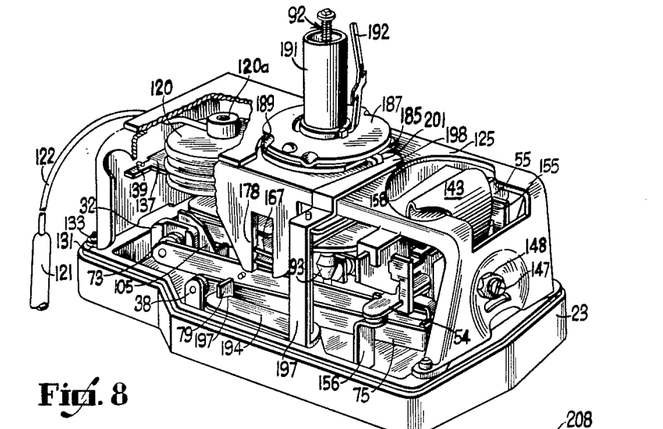
Fig. 8 is a perspective view of the controller with the cover, adjusting knob and push button removed, and showing the frame partly in section.
Figure 9:
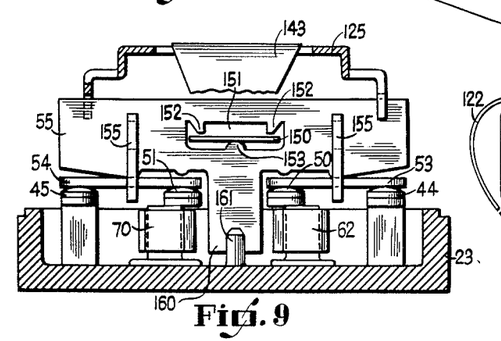
Fig. 9 is a fragmentary sectional view taken substantially along the line 9—9 of Fig. 2.

Resilient arm 72 of conductor 71 is biased, upwardly, as viewed in Figs. 12, 13, 14 and 15 so that it normally tends to press contact 73 against contact 57. However, it is restrained from closing contact 73 on contact 57 by the bimetallic strips 104 and 105 through the pin type link 108 when the cam 93 is in the position shown in Figs. 12, 14 or 15. As seen more clearly in Fig. 6, the pin 108 is provided with a reduced shank portion 109 at each end which loosely fits within the holes 110 in bimetallic strip 104 and conductor arm 72. Strip 104, bearing upon the shoulder 111 of pin 108, forces the same downwardly, as viewed in Fig. 6 and the shoulder 112 of pin 108 bears upon the strip 72 and forces the same downwardly whereby the contact 73 is maintained separately from contact 57. When the cam 93 is moved to the position shown in Fig. 13, a contact 114 carried by the bimetallic strip 104, on the opposite side from that of the follower 103, will engage a contact 115 on the resilient arm 67. Simultaneously, due to the biasing effect of arm 72, it will cause contact 73 to engage contact 57, since through the camming action, the pin 108 can be moved upwardly. At this time the broil coil will be connected as previously described except instead of current passing from contact 68 to contact 40, to the terminal 39, the current will flow through arm 67, contacts 115 and 114, bimetallic strips 104 and 105 to the bus bar 107 of the terminal 39.

The bimetallic thermostatic strip 104 is formed of relatively high current resisting material, and therefore, as current flows through the broil circuit, the strip 104 will quickly pull upwardly, as viewed in Fig. 15, and will push contacts 68 into engagement with contact 60, to thereby shunt the bimetallic strip by contacts 68, 60 and bus bar 107. In this manner the heavy load of the broil coil is not constantly carried by the sensitive bimetallic strip 104. The purpose of forming strip 105 of thermostatic bimetallic material is to compensate for changes in environment temperatures to which strip 104 is subjected. Increase in environment temperatures, tends to bow strip 104 upwardly while increase in temperature will bow strip 105 downwardly so that the relative position of the cam follower 103 is not changed by changes in environment temperature.

Figure 1:
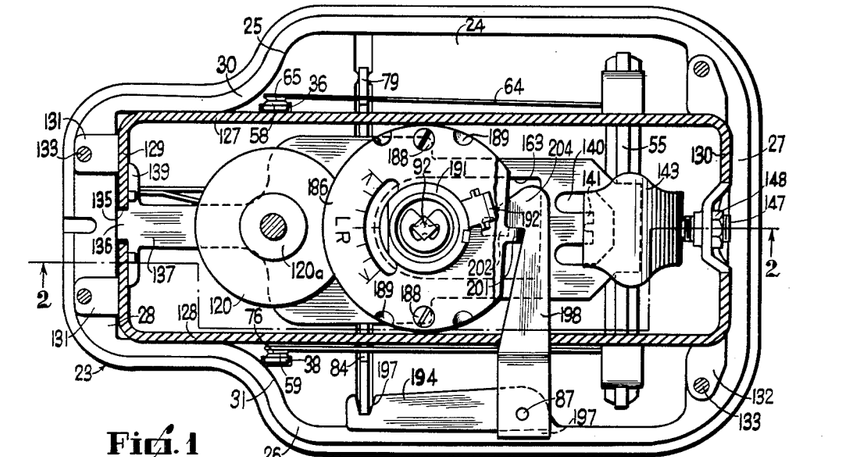
Fig. 1 is a top plan view of the improved controller showing part of the frame in section, the section being somewhat irregular and taken substantially along the line 1—1 of Fig. 2, and showing the cover, the adjusting knob and the push button removed.
Figure 2:
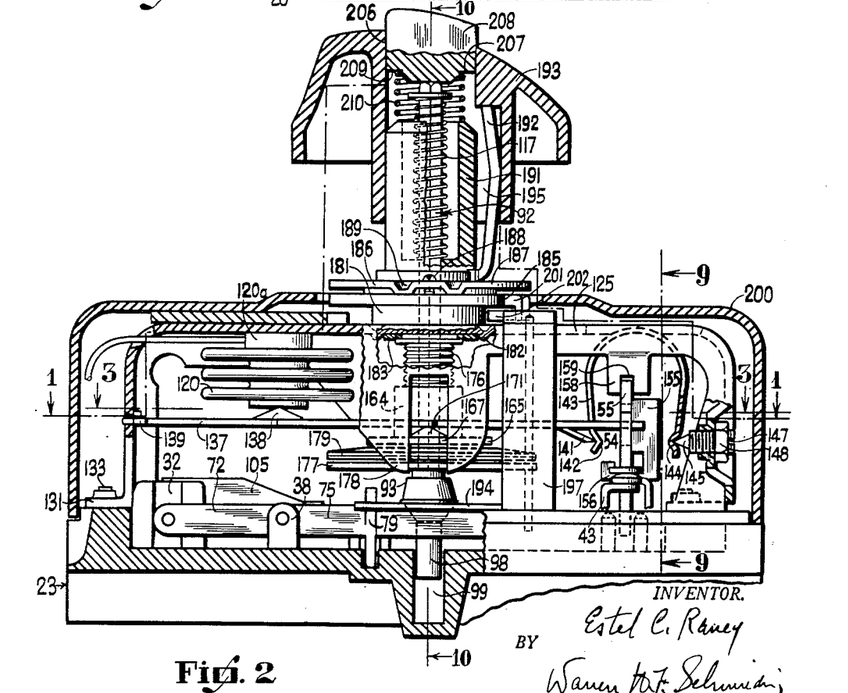
Fig. 2 is a side view partly in section, the section being taken along line 2—2 of Fig. 1.
Figure 3:
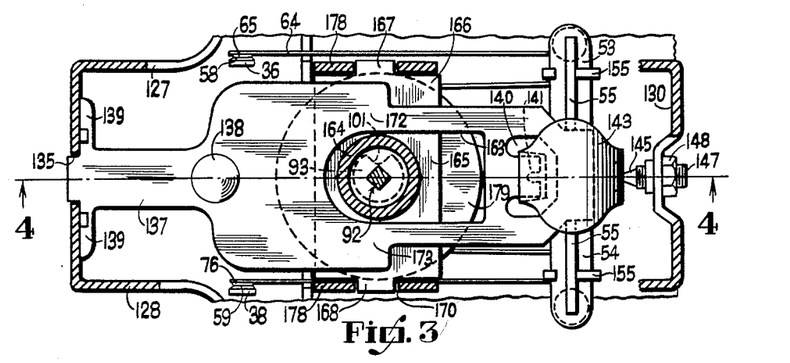
Fig. 3 is a fragmentary sectional view, the section being taken substantially along line 3—3 of Fig. 2.
Figure 4:
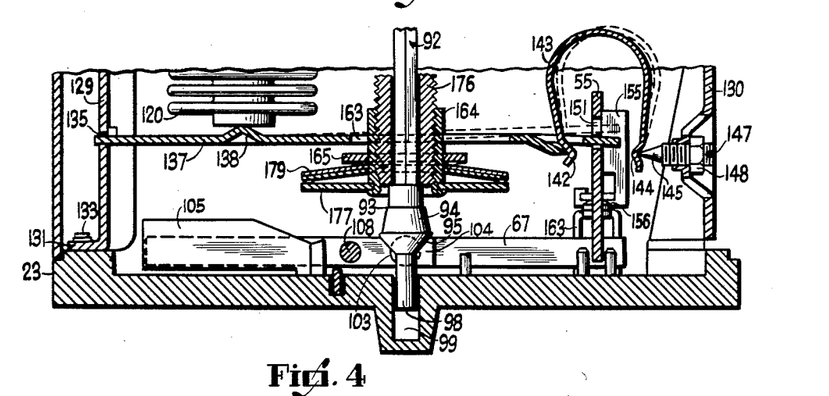
Fig. 4 is a fragmentary sectional view taken substantially along line 4—4 of Fig. 3.
Figure 10:
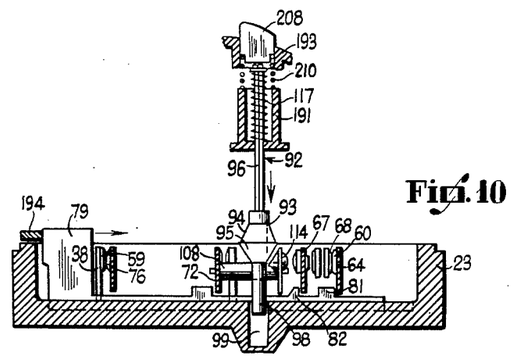
Fig. 10 is a fragmentary sectional view showing the base and the elements carried, and showing part of the push button mechanism in sections, the sections being taken substantially along line 10—10 of Fig. 2 but showing the push button and adjusting knob rotated at an angle of 90° than that shown in Fig. 2.
Figure 11:
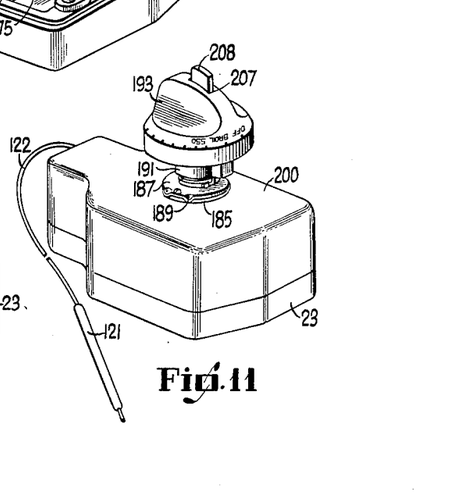
Fig. 11 is a perspective view of the controller showing the cover and adjusting knob in position.
Figure 12:
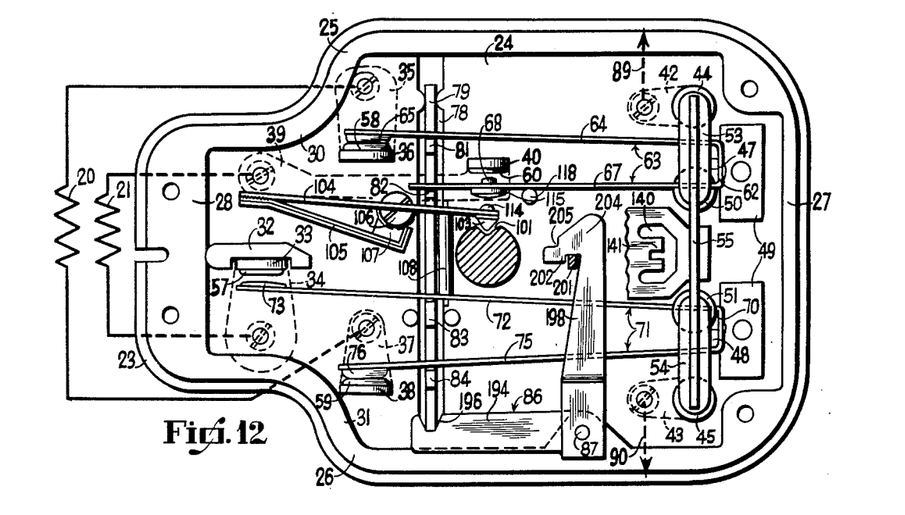
Fig. 12 is a top plan view of the space and switching mechanism carried thereby, the push rod being shown in sections.

The upper part of cam 93 including the surface 94 provides a latching element, and the cam follower 103 forms a cooperating latching element. A spring 117 normally urges the push rods 92 upwardly, but this upward movement of the push rod is prevented while cam bar 103 is latched over the surface 94 of cam 92. The shapes of the cam surface 94 and cam follower 103 and the relative position of contacts 114 and 68 is such that the push button is not released by the cam follower 103 until after contact 114 engages contact 68. It will be observed from Fig. 12 that the downward movement of contact 115 is limited by a stop 118 which is engaged by the resilient arm 67, carrying the contact 115. After predetermined upward movement of the strip 104, the cam follower 103 which had functioned as a latch element, will move out of latching engagement with the surface 94 of cam 93 whereby the spring 117 will move the cam 93 and the push rod to the position shown in Figs. 4 and 10.

As will be more fully described hereinafter, the bridging contacts 53 and 54 are lifted from said cooperating contacts 44 and 50, and 51 and 45, respectively, when the temperature of the oven has obtained a predetermined high value. When the temperature of the oven falls to a predetermined low value, these bridging contacts will again be brought into contact to close the circuit between 44 and 50 and between 51 and 45. During the period in which the heating coils 20 and 21 are deenergized, the bimetallic strip 104 will cool and move to the position shown in Fig. 14 wherein the lifted cam 93 will lie above the cam follower 103 and contact 114 will have moved away from contact 115. The resilient arm 67 of the conductor 63, being biased downwardly, as viewed in Fig. 12, will move against the stop 118, in which latter position contact 68 is separated from contact 60. Also during this cooling, bimetallic strip 104 will push resilient arm 72 of conductor 71 downwardly through the pin 108 to thereby separate contact 73 from contact 57. Therefore, when contacts 44 and 50 and contacts 51 and 45 are bridged again, by their bridging contacts 53 and 54, only coil 20 will receive current, since there is no circuit connection between arm 67 and terminal 39 and no circuit connection between terminal 34 and the arm 72. In this manner the broil coil is automatically disconnected from the electrical circuit after one heating phase of the oven.

The automatic system for opening and closing the main switch comprises a thermostatic system including a metallic bellows 120, a bulb 121 and a connecting tube 122. This thermostatic system is filled with a liquid which is adapted to expand and contract in response to increase and decrease in temperature. The bulb 121 is suitably positioned in heat exchange relation with the oven so that the bellows 120 is expanded and contracted in response to increase and decrease, respectively, in temperature of the oven. The upper end of bellows 120a is suitably secured to the under side of a top wall 124 of a frame 125. The frame also includes side walls 127 and 128, a left end wall 129, and a right end wall 130. This frame is preferably formed of stainless steel, the lower portion of the end walls 129 and 130 being provided with integral ears 131 and 132 which rest upon the base 23 and are secured thereto by screws 133. Substantially midway of the top and bottom of the frame 124, the end wall 129 is provided with a horizontally extending slot 135 which receives the left end 136 of a tempered, metallic, leaf spring 137. Leaf spring 137 extends lengthwise of the frame and underneath the bellows and is provided with an upwardly pressed cone shaped portion 138, the apex of which is in abutting relation with the bottom of bellows 121. Bearing arms 139, formed integrally with the leaf spring, bear against the inside of wall 129 on opposite sides of the slot 135 to form a fulcrum for the leaf spring 137. Adjacent the right end, the leaf spring 137 is provided with an opening 140 so shaped as to provide an ear 141. The right end of this ear is formed as a knife edge which extends into a socket 142 of one leg of a tempered, horseshoe shaped, metallic, leaf spring 143. The opposite leg of the spring 143 is also formed with the socket 144 which receives a horizontally extending pin 145. The shank of this pin 145 is threaded into the end wall 130 of the frame, the outer end thereof being provided with a screw driver slot 147. Spring 143 is biased to spread the legs thereof outwardly. The tension of the spring 143 can be adjusted by horizontal movement of the pin 145. The pin 147 is locked in position by lock nut 148. The right end 150 of the leaf spring 137 extends through an opening 151 in the tie bar 55. The extent of vertical movement of the end 150 is limited by downwardly projecting ears 152 and an upwardly projecting ear 153 of the tie bar 55. Bridging contacts 53 and 54 are secured to the tie bar by clips 155. The lower end of these clips are hook-shaped as shown at 156, notches being formed intermediate the ends of the bridging contact which receive the hook to thus retain the bridging contacts in position while permitting limited pivotal movement of the contact. The side walls 127 and 128, directly above the tie bar 55 are provided with downwardly projecting ears 158 which are slotted as at 159 to form guides for the upper part of the tie bar 55. The lower end of tie bar 55 is provided with the downwardly extending tab 160 which lies between two spaced posts 161.

Midway of the length of the leaf spring 137, it is provided with an opening 163 to receive a sleeve 164 of an adjustable stop or fulcrum 165. In addition to the sleeve 164, the adjustable stop or fulcrum includes a plate 166 through which the sleeve 164 extends and has a rear peripherally extending ear 167 and a similar ear 168 at the front. These ears are arranged to be guided by the side walls of a vertically extending slot 170 formed in the side walls 127 and 128 of the frame 126. The top of plate 166, at the front and rear and in alignment with the axis of the sleeve 164, is provided with two upwardly pressed cone shaped portions 171 forming bearings which are arranged to engage the runs 172 and 173 of the leaf spring 137, to form a central bearing for the leaf spring.

Let us assume that the bridging contacts 53 and 54 are in contact, respectively, with contacts 44 and 50 and 51 and 45. Now as the temperature of the oven increases, the bellows 120 will expand, the lower part of the bellow moving downwardly and pressing on the projection 133 of the leaf spring, forcing the section thereof, between the left end and the bearings 171, downwardly, and thus tending to tilt the right end of the leaf spring 137 upwardly. This upward movement however is resisted by the horseshoe shaped leaf spring 143. However when the upward force of the right end of the leaf spring exceeds that of the horseshoe shaped spring, the bridging contacts will be lifted by a snap acting motion through the snap acting mechanism including the leaf spring 143. When the bellows cools, due to the cooling of the oven, the pressure of the bellows on the leaf spring 137 is reduced with the result that when the bellows moves a predetermined distance, the bridging contacts will be closed on their cooperating contacts with the snap acting movement. The differential between the opening and closing of the contacts can be adjusted by adjusting the tension of the actuating spring 143 through the adjustment of the pin 145.

The sleeve 164 is threaded internally to receive a hollow threaded screw 176. By turning the screw 176, stop 165 including sleeve 164 and plate 166 can be raised and lowered. A plate 177 is suitably secured to the extreme lower end of sleeve 164 and is provided with rearwardly and forwardly extending ears 178 which also ride in and are guided by the slot 170 in the side walls 127 and 128 of the frame 125. Sleeve 164 extends through a central opening in a bimetallic disc 179 and also through the plate 166. Bimetallic disc 179 is interposed between the plate 177 and plate 166 and since the bearings 171 of the plate 166 are held down by the leaf spring 137, the plate 166 is pressed against the bimetallic disc 179 and the bimetallic disc is pressed against the lower plate 177. It will be seen that by turning the screw 176 in one direction, the legs 172 and 173 of leaf spring 137 will be raised, and when the screw 176 is turned in the opposite direction, the plate 177 will be lowered and the tension of leaf spring 137 will force the plate 166 and the disc 179 downwardly. In this manner the vertical level of the bearings 171 are changed whereby the range of temperature at which the main switch opens and closes can be varied, the lower the position of the bearings 171, the higher need be the pressure within the bellows to move the switch.

The bimetallic disc 179 flexes in response to variations in ambient temperature to thereby change the positions of bearings 171 to compensate for the corresponding changes which will occur in the volume of the bellows 120 per se due to the ambient temperatuer changes of the liquid in the bellows. Hence, the changes in volume of liquid in bulb 121 effected by changes in oven temperature will cause consistent temperature responsive operations of the switch mechanism regardless of temperature variations in the casing for the bellows and switch mechanism.

Screw 176 is journaled in the top cover 124 of the frame 125 and is provided with an enlarged portion 181 which rides upon the top of cover 124. Any suitable means may be employed for holding the screw for rotation in the frame. For example, a circular groove 182 may be cut therein and a split ring 183 can be fitted in the groove 182 which will prevent the lifting of the screw out of the frame. A ring shaped cam 185 surrounds the enlarged portion 181 of screw 176. This cam is arranged to be held in place by a still further enlarged and top portion 186 of the screw 176. A resilient disc 187 is disposed above the enlarged portion 186 and is secured to the ring shaped cam 185 by screws 188.. Downwardly extending beads 189 are formed on the disc 187 on opposite sides of the screw hole openings in the disc 187. The screws pass freely through the openings in the disc 187 and are threaded into the ring shaped cam 185. When these screws are tightened, the enlarged portion 186 of the screw 176 is clamped between the disc 187 and the cam 185. A cup 191 is suitably attached to the disc 187 and an upwardly extending and offset arm 192 is suitably attached to the cup. A knob 193 fits over the cup 191 and is provided with an offset recess portion 195 which receives the ram 192 so that the knob 193 can be placed only in one position with respect to the cup 171. By turning the knob 193, movement will be imparted to the cup 191 through the arm 192. The cup in turn will rotate the disc 187, the cam 185 and the screw 176, the flange portion 186 of the screw 176 being clamped between the disc 187 and the cam 185. Thus by turning the knob 193 the sleeve 164 will be raised or lowered depending upon the direction or rotation of the knob. The relative position of the knob with respect to the sleeve can be adjusted by loosening the screws 188 and then turning the knob i. e. when the screws 188 are loosened and the knob is turned, motion is not imparted to the screw 176. Indicia are placed upon the knob and after the switch mechanism is set to function at the desired temperature, the knob, with the screws 188 loosened, is adjusted to correspond with the setting of the switch. Then the screws 188 are tightened.

The push rod 92 extends longitudinally through the screw 176 and the cup 91. The opening in the cup 191 for receiving the push rod 92 has the same shape as that of the push rod, namely square. Therefore, when the knob 193 and consequently cup 191 are turned, the push rod 92 and the cam carried thereby are also turned, and the notch 101 in the peripheral surface of the cam 93 is so arranged that when the knob is turned to either the "off" position or "broil" position, the notch 101 is opposite the cam follower 103. Should the push button be accidentally actuated while the controller is in the "off" or "broil" position, the broil circuit is not affected.

The bell crank lever 86, for shifting the slide bars 79 in one direction, includes a lower arm 194 which is notched at 196 to receive the forward end of the slide bar 79. Lever 86 also includes an upright arm portion 197. Another arm 198 extends rearwardly from the upper end of portion 197. The fulcrum pin 87 extends into a hole in the base 23 and is prevented from becoming displaced by the cover 200. The arm 198 extends above the top 124 of frame 125 and the end thereof lies to the right of the enlarged portion 181 of screw 176. The cam 185 is provided with a downwardly extending ear 201 and an inwardly extending portion 202 of arm 198 lies in the path of movement of the ear 201. Counterclockwise movement of the cam, and consequently the knob 193, is limited by the engagement of ear 201 with the projecting portion 202 of the arm 198. When the cam and knob is in that position, the switch is in an "off" position. When the knob is moved to this position, the adjustable stop mechanism 165, acting on leaf spring 137, opens the main switch, the adjustable stop being raised to such height that, contraction of the bellows 121, due to the cooling of the oven to environment temperature, the snap acting mechanism cannot close the switch. Thus the control mechanism fuctions also as an "on" and "off" switch.

After the controller is moved a predetermined distance in a clockwise direction, lowering the adjustable stop 165, the main switch will be closed and will remain closed until the oven attains a predetermined high temperature so as to maintain a mean temperature within the oven, selected by the operator by the extent of movement of the knob 193. Preferably the degrees of temperature are placed on the knob and a marker is placed on the stove. The highest temperature setting on the knob of 550° Fahrenheit lies approximately 350° from the "off" position. Further movement of the knob in a clockwise direction causes the ear 201 on the cam 185 to engage a camming surface 204, on the end of lever arm 198, to move the bell crank lever 86 in a clockwise direction about its fulcrum pin 87. This will cause an upward movement, as viewed in Fig. 12, of the shifting bar 79. This camming surface 204 is notched as at 205 so as to provide a resistance latch and a stop to prevent further clockwise movement of the knob. As previously stated this shifting of the shifting bar 79 interrupts the bake circuit 20 and connects the broil coil in circuit. To interrupt the broil circuit, the knob is turned in a counterclockwise direction, and the resilient arm 67 of conductor 63, pressing on the projection 82 of the slide bar 79, will shift the slide bar and the contact to the position in Fig. 12.

The coil spring 117 for lifting the push rod 92 surrounds the push rod and is interposed between an abutment 207 at the top end of the rod and the bottom of the cup 191. A substantially rectangular slot 206 is formed in the outer end of the knob 193 in alignment with the push rod 92. A push button having a substantially rectangular shaped portion slides within the slot 206 and is provided with a shoulder 209 which is arranged to engage the inner side of the push button to prevent outward displacement of the button. A spring 210, urging the push button outwardly, is interposed between the lower part of the push button and the top of the cup 191. The inner end of the push button 208 is arranged to engage the top of the push rod 92 so that when the push button 208 is pushed inwardly, the push rod 92 is pushed downwardly to, as previously stated, interrupt the bake circuit and to connect the broil circuit in parallel with the bake circuit as previously described.

While the form of mechanism of the present invention as herein disclosed constitutes a preferred form, it is to be understood that other forms might be adopted, all coming within the scope of the claims which follow.

I claim:

1. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; a second latching element cooperating with the latching element of said mechanism for holding the contacts closed; and means movable in response to current flow in the circuit controlled by said contacts for moving the second latching element out of latching position with the first latching element and for holding said contacts in closed position independently of the first-mentioned latching element during the time current flows in said circuit and movable in response to cessation of said current flow to cause re-opening of said contacts.

2. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; a temperature responsive element for holding the contacts closed, said temperature responsive element being movable in response to current flow in the circuit controlled by said contacts for moving the latching element out of latching position and for holding said contacts in closed position independent of the latching means during the time current flows in said circuit and movable in response to cessation of said current flow to cause re-opening of said contacts.

3. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; a thermostatic element carrying one of the contacts and forming a latching element cooperating with the latching element of said mechanism for holding the contact carried thereby in contact with the other contact, said thermostatic element being in the circuit controlled by the contacts and movable, in response to heat generated therein when current flows therethrough, out of latching position with the first mentioned latching element while holding said contacts in closed position independently of the first-mentioned latching element.

4. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; a thermostatic element carrying one of the contacts and forming a latching element cooperating with the latching element of said mechanisms for holding the contact carried thereby in contact with the other contact, said thermostatic element being in the circuit controlled by the contacts and movable, in response to heat generated therein when current flows therethrough, out of latching position with the first mentioned latching element while holding said contacts in closed position independently of the first-mentioned latching element; an electrical conductor; a third contact connected with the conductor, said third contact and conductor being connected in parallel circuit relation with the thermostatic element by movement of the thermostatic element in response to flow of current through the latter.

5. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; thermal responsive means including a latching element cooperating with the latching element of the mechanism for holding the contacts closed, said thermal responsive means being responsive to current flow in the circuit controlled by said contacts for moving the second latching element out of latching position with the first latching element and for holding said contacts in closed position independently of the first-mentioned latching element; an electrical conductor; a third contact connected with the conductor, said third contact and conductor being connected in parallel circuit relation with the thermal responsive means by movement of the second latching element in response to current flow in the thermal responsive means.

6. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; thermal responsive means including a latching element cooperating with the latching element of the mechanism for holding the contacts closed, said thermal responsive means being heated by current flow in the circuit controlled by said contacts for moving the second latching element out of latching position with the first latching element and for holding said contacts in closed position independently of the first-mentioned latching element; a thermostatic element responsive to environment temperature carrying the thermal responsive means; an electrical conductor; a third contact connected with the conductor, said third contact and conductor being connected in parallel circuit relation with the thermal responsive means by movement of the second latching element in response to current flow in the thermal responsive means.

7. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; thermal responsive means including a latching element cooperating with the latching elemetn of the mechanism for holding the contacts closed, said thermal responsive means being responsive to current flow in the circuit controlled by said contacts for moving the second latching element out of latching position with the first latching element and for holding said contacts in closed position independently of the first-mentioned latching element; a thermostatic element responsive to environment temperature carrying the thermal responsive means, said thermal responsive means and said thermostatic element being connected in series circuit relation with said contacts; an electrical conductor; a third contact connected wtih the conductor, said third contact and conductor being connected in parallel circuit relation with the thermal responsive means by movement of the second latching element in response to current flow in the thermal responsive means.

8. A controller for a heating system having two heating circuits and switching mechanism for connecting and disconnecting the heating circuits with a source of electrical current, said controller comprising a switch for one of the heating circuits; said switch including two contacts; manually movable mechanism for closing said contacts when moved from one position to another position and including a latching element, means constantly urging said mechanism toward the first mentioned position; thermal responsive means including a latching element cooperating with the latching element of the mechanism for holding the contacts closed, said thermal responsive means being responsive to current flow in the circuit controlled by said contacts for moving the second latching element out of latching position with the first latching element and for holding said contacts in closed position independently of the first-mentioned latching element; a thermostatic element responsive to environment temperature carrying the thermal responsive means, said thermal responsive means and said thermostatic element being connected in series circuit relation with said contacts; an electrical conductor; a third contact connected with the conductor, said third contact and conductor being connected in parallel circuit relation with the thermal responsive means by movement of the second latching element in response to current flow in the thermal responsive means; and manually operated means for simultaneously rendering the latching mechanism ineffective and for connecting the conductor in said parallel circuit relation.

9. A controller for a heating system having two heating circuits and switching mechanism for connecting and disconnecting the heating circuits wth a source of electrical current, sad controller comprising a switch for one of the heating circuits; said switch including two contacts; manually movable mechanism for closing said contacts when moved from one position to another position and including a latching element, means constantly urging said mechanism toward the first mentioned position; a second latching element cooperating with the latching element of said mechanism for holding the contacts closed; means movable in response to current flow in the circuit controlled by said contacts for moving the second latching element out of latching position with the first latching element and for holding said contacts in closed position independently of the first-mentioned latching element; a second switch including a pair of contacts; mechanism responsive to a condition to be controlled for opening and closing the second mentioned switch contacts including tensioning means and means manually movable for adjusting the tension of the tensioning means, said manually movable means being movable to a position for directly closing the first mentioned contacts.

10. A controller for a heating system having two heating circuits and switching mechanism for connecting and disconnecting the heating circuits with a source of electrical current, said controller comprising a switch for one of the heating circuits; said switch including two contacts; push button mechanism for closing said contacts when moved from one position to another position and including a latching element, means constantly urging said push button mechanism toward the first mentioned position; a second latching element cooperating with the latching element of said mechanism for holding the contacts closed; means movable in response to current flow in the circuit controlled by said contacts for moving the second latching element out of latching position with the first latching element and for holding said contacts in closed position; a second switch including a pair of contacts; mechanism responsive to a condition to be controlled for opening and closing the second mentioned switch contacts including tensioning means and means manually movable for adjusting the tension of the tensioning means, said push button mechanism being rotatable to a nonlatching position, said manually movable means being rotatably connected with the push button mechanism for rotating the same to its nonlatching position, and means actuated upon the movement of the manually movable means for directly closing the first mentioned contacts when said manually movable means moves the push button mechanism to its nonlatching position.

11. A controller for a heating system having two heating circuits and switching mechanism for connecting and disconnecting the heating circuits with a source of electrical current, said controller comprising a switch for one of the heating circuits; said switch including two contacts; a manually movable mechanism including a push rod having a cam on the periphery thereof for moving one of said contacts against the other contact and forming a latching element, said push rod being rotatable to a noncamming and nonlatching position, means constantly urging said rod toward nonlatching position, means for rotating the push rod; a second latching element cooperating with the push rod for holding the contacts closed; means movable in response to current flow in the circuit controlled by said contacts for moving the second latching element out of latching position with the latching element of the push rod and for holding said contacts in closed position; a second switch including a pair of contacts; mechanism responsive to a condition to be controlled for opening and closing the contacts of the second mentioned switch including adjustable tensioning means controlled by the rotation of the means for rotating the push rod.

12. A controller for a heating element of an electric stove or the like comprising, a movable contact; mechanism manually movable for moving the contacts from one position to another and including a latching element; means constantly urging said mechanism toward the first mentioned position; a second latching element cooperating with the latching element of the mechanism for holding the contact in the second mentioned position; and means moved from the first mentioned position to the second mentioned position in response to energization of the heating element for moving the second mentioned latching element out of latching position with the first mentioned latching element and for holding said contact in its second mentioned position independently of the first mentioned latching element during the time said heating element is energized and movable in response to deenergization of said heating element to cause said contact to return to its first-mentioned position.

References Cited in the file of this patent

UNITED STATES PATENTS

| Number | Name | Date |
|---|---|---|
| 2,121,079 | Eskin | June 21, 1938 |
| 2,184,339 | Effinger | Dec. 26, 1939 |
| 2,197,230 | Waddell | Apr. 16, 1940 |
| 2,276,930 | Clark | Mar. 17, 1942 |
| 2,310,543 | Pearce | Feb. 9, 1943 |
| 2,388,702 | Pearce | Nov. 13, 1945 |
| 2,410,013 | Clark | Oct. 29, 1946 |
| 2,410,014 | Clark | Oct. 29, 1946 |
| 2,434,467 | McCormick | Jan. 13, 1948 |
| 2,435,530 | Candor | Feb. 3, 1948 |
| 2,441,192 | Graves | May 11, 1948 |
| 2,451,576 | Pearce | Oct. 19, 1948 |
| 2,496,889 | Pearce | Feb. 7, 1950 |
| 2,514,881 | Leupold | July 11, 1950 |
| 2,630,515 | McCormick et al. | Mar. 3, 1953 |